United States Patent
Chavan et al.

(10) Patent No.: US 11,418,839 B2
(45) Date of Patent: Aug. 16, 2022

(54) AUTOMATIC MEDIA CONTROL

(71) Applicant: Dell Products L.P., Round Rock, TX (US)

(72) Inventors: Deepthi Chavan, Bangalore (IN); Anil Maryala, Bangalore (IN); Bharathvamsi Vooradi, Bangalore (IN); Smriti Prakash, Bangalore (IN); Nalapareddy Reddy Dheeraj Reddy, Bangalore (IN); Vishnu Ajit Kishore Reddy Koyya, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/936,206

(22) Filed: Jul. 22, 2020

(65) Prior Publication Data
US 2022/0030302 A1 Jan. 27, 2022

(51) Int. Cl.
*H04N 21/439* (2011.01)
*G06F 3/16* (2006.01)
*H04N 21/462* (2011.01)
*H04L 65/60* (2022.01)
*H04L 65/1066* (2022.01)
*G06N 20/00* (2019.01)
*G10L 25/51* (2013.01)

(52) U.S. Cl.
CPC ......... *H04N 21/4396* (2013.01); *G06F 3/165* (2013.01); *H04N 21/462* (2013.01); *G06N 20/00* (2019.01); *G10L 25/51* (2013.01); *H04L 65/1066* (2013.01); *H04L 65/60* (2013.01)

(58) Field of Classification Search
CPC .............. H04N 21/4396; H04N 21/462; H04L 65/1066; H04L 65/60; G06N 20/00; G06F 3/165; G10L 25/51
See application file for complete search history.

(56) References Cited

U.S. PATENT DOCUMENTS

| | | | | |
|---|---|---|---|---|
| 5,703,794 A | * | 12/1997 | Heddle | G06F 3/165 370/267 |
| 6,286,025 B1 | * | 9/2001 | Chang | G06F 11/006 718/100 |
| 8,681,203 B1 | * | 3/2014 | Yin | H04N 7/15 348/14.08 |
| 9,389,828 B1 | * | 7/2016 | Zelenov | H03G 3/3089 |
| 10,863,580 B1 | * | 12/2020 | Baldassarre | H04W 76/11 |
| 2007/0068367 A1 | * | 3/2007 | Schmidt | A63F 13/10 84/600 |

(Continued)

FOREIGN PATENT DOCUMENTS

CN 106445449 B * 7/2019 ............. G06F 3/167

*Primary Examiner* — James R Sheleheda
(74) *Attorney, Agent, or Firm* — Kirton McConkie; Brian Tucker

(57) ABSTRACT

Media can be automatically controlled. A media control service can be configured to detect changes in the active application on a computing device and, in response, mute, pause or otherwise control the audio of one or more non-active applications to thereby prevent overlapping of audio. The media control service may leverage a policy to customize such control for a particular user, use case or other scenario. The media control service may also leverage machine learning to adapt such control based on a user's interactions with the computing device.

14 Claims, 7 Drawing Sheets

(56) References Cited

U.S. PATENT DOCUMENTS

| | | | |
|---|---|---|---|
| 2009/0177965 A1* | 7/2009 | Peralta | G06F 9/451 |
| | | | 715/716 |
| 2010/0235306 A1* | 9/2010 | Wagoner | G06Q 10/1095 |
| | | | 706/12 |
| 2013/0167027 A1* | 6/2013 | Adolph | G06F 3/0482 |
| | | | 715/716 |
| 2014/0068434 A1* | 3/2014 | Filev | G06F 3/0484 |
| | | | 715/716 |
| 2015/0012556 A1* | 1/2015 | Tu | G06F 16/638 |
| | | | 707/758 |
| 2015/0128063 A1* | 5/2015 | Jones | H04L 63/10 |
| | | | 715/741 |
| 2018/0285147 A1* | 10/2018 | Engler | G06F 11/362 |
| 2018/0287983 A1* | 10/2018 | Li | H04L 51/216 |
| 2018/0302494 A1* | 10/2018 | Jain | H04L 67/34 |
| 2020/0257491 A1* | 8/2020 | Yellin | H04L 69/329 |
| 2020/0394053 A1* | 12/2020 | Jain | G06F 8/61 |

* cited by examiner

AUTOMATIC MEDIA CONTROL

CROSS-REFERENCE TO RELATED APPLICATIONS

N/A

BACKGROUND

While a user is using a computing device, media may oftentimes be played in multiple applications simultaneously. For example, while a user has a first browser tab open, he or she may open a second browser tab (or window) to watch a video. While watching the video in the second browser tab, a video may continue playing or commence playing in the first browser tab. In this scenario, the audio from the two simultaneously playing videos will overlap making it difficult for the user to understand the audio of the video playing in the second browser tab. A user may have multiple browser tabs or windows open which simultaneously play media. Similar scenarios occur with a wide variety of applications that can play media. As another example, if a user receives a notification or alert, the audio that is played for the notification or alert may overlap with any other audio that is being played which may cause the user to miss the notification or alert. As a further example, while a user is participating in a meeting on his or her computing device, a notification or alert may cause audio to be played thereby distracting the user. In short, there are many different scenarios where overlapping audio may degrade the user experience.

BRIEF SUMMARY

The present invention extends to methods, systems, and computer program products for automatically controlling media. A media control service can be configured to detect changes in the active application on a computing device and, in response, mute, pause or otherwise control the audio of one or more non-active applications to thereby prevent overlapping of audio. The media control service may leverage a policy to customize such control for a particular user, use case or other scenario. The media control service may also leverage machine learning to adapt such control based on a user's interactions with the computing device.

In some embodiments, the present invention may be implemented by a media control service executing on a computing device as a method for automatically controlling media. The media control service may identify a plurality of audio sessions on the computing device and determine that one or more audio sessions of the plurality of audio sessions do not pertain to an active application. The media control service may then prevent audio from the one or more audio sessions from being audibly output on the computing device.

In some embodiments, the present invention may be implemented as computer storage media storing computer executable instructions which when executed implement a media control service that is configured to perform a method for automatically controlling media. This method may include: identifying an active application; identifying a plurality of audio sessions on the computing device; identifying a first audio session of the plurality of audio sessions that pertains to the active application; and preventing audio from one or more other audio sessions of the plurality of audio sessions from being audibly output on the computing device.

In some embodiments, the present invention may be implemented as a computing device that includes one or more processors and one or more computer storage media storing computer executable instructions which when executed by the one or more processors implement a media control service that is configured to perform a method for selectively muting audio sessions. This method may include: identifying an active application; identifying a plurality of audio sessions on the computing device; determining that one or more audio sessions of the plurality of audio sessions do not pertain to the active application; and muting the one or more audio sessions.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
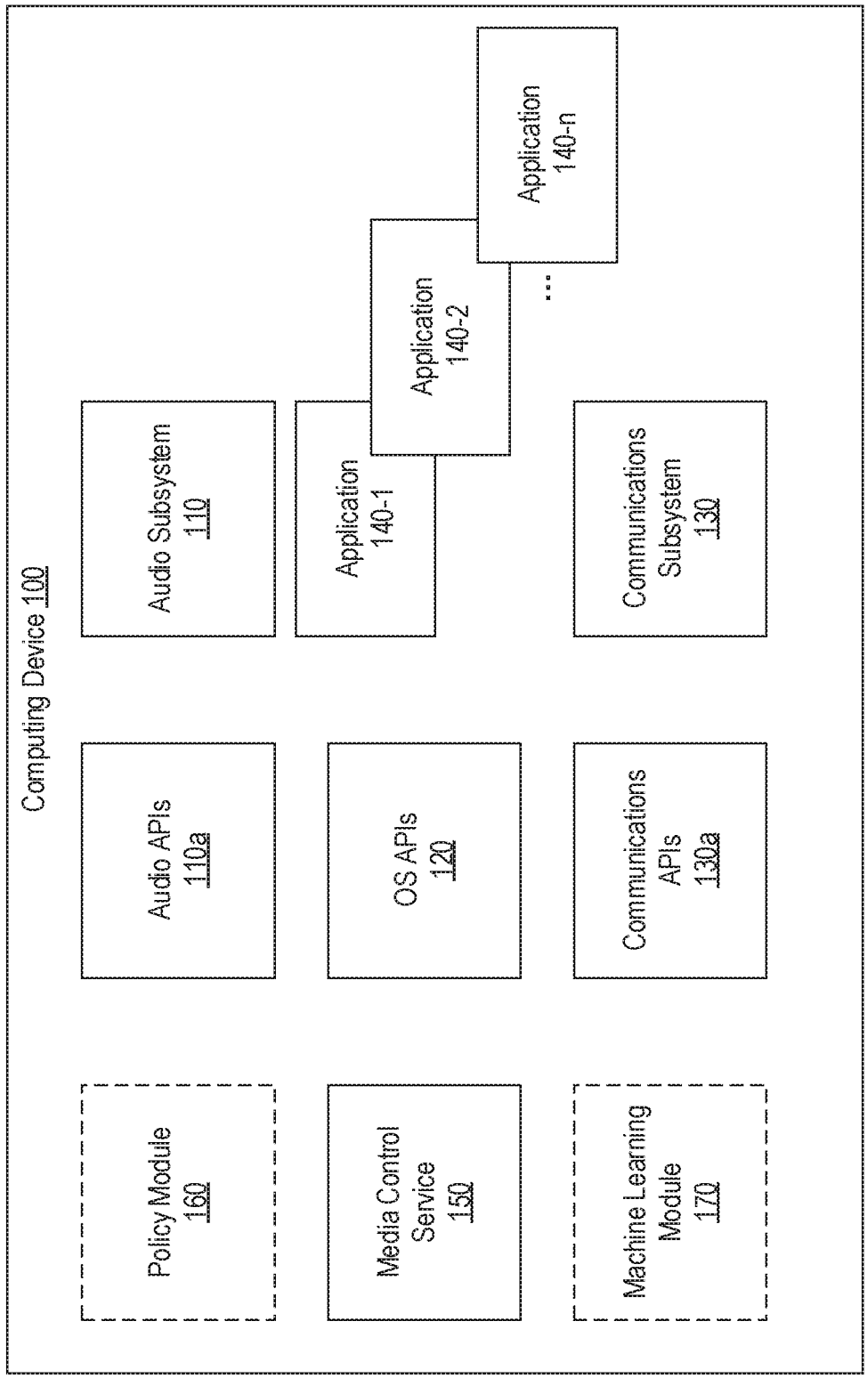
FIG. 1 illustrates an example architecture of a computing device that is configured in accordance with one or more embodiments of the present invention.

FIG. 1 provides an example architecture of a computing device 100 that is configured in accordance with one or more embodiments of the present invention. Computing device 100 may represent a desktop, laptop, tablet, thin client, smart phone or other type of computing device that a user may employ to run applications that play media. Computing device 100 may typically include an operating system that provides a platform by which applications 140-1 through 140-n (collectively applications 140) may play media. For purposes of this descriptions, the term "media" should be construed as encompassing only audio or both audio and video. Applications 140 can represent any application that may execute on computing device 100. However, it will be assumed that applications 140 represent applications that play media such as any number of browsers, different instances (e.g., windows or tabs) of the same browser, dedicated multimedia applications (e.g., the Windows Media Player, the VLC Media Player, iTunes, Spotify, etc.), communications applications (e.g., Zoom, Skype, GoToMeeting, etc.), productivity applications (e.g., Outlook), etc.

An audio subsystem 110 may form part of the media platform available on computing device 100 and may provide audio APIs 110a. Audio APIs 110a are intended to represent any number of interfaces, functions or other constructs by which media control service 150 can perform the functionality described herein and should not be limited to any of the examples used in describing this functionality. As examples only, audio APIs 110 could represent the Core Audio APIs provided by the Windows operating system, the Simple or Asynchronous APIs of the PulseAudio sound server or the Advanced Linux Sound Architecture (ALSA) API available on Linux-based systems, the Core Audio frameworks available on iOS, etc.

Computing device 100 may also include operating system (OS) APIs 120 which are intended to represent any number of interfaces, functions or other constructs by which media control service 150 can obtain information about applications 140 as described herein and should not be limited to any of the examples used in describing this functionality. As examples only, OS APIs 120 could represent the Windows (Win32) API, the X interface on a Linux-based system, the UIKit framework in iOS, etc.

In some implementations, computing device 100 may also include a communications subsystem 130, such as Lync, Zoom, Webex, etc., by which communications applications establish meetings. In such cases, computing device 100 may also include corresponding communications APIs 130a which may enable other components, such as media control service 150, to obtain information about such meetings. As examples only, communications APIs 130a could represent the Lync (or Skype) API, the Zoom API, the Webex API, etc.

Media control service 150 can represent any executable component(s) that may be employed on computing device 100 to perform the functionality described herein. As an overview, media control service 150 can be configured to detect which of applications 140 is active (e.g., by employing OS APIs 120a to identify the foreground application) and can employ audio APIs 110a to mute the audio (or pause the media) of each of the other applications so that audio played by the other applications will not overlap with the active application's audio. In some instances, such as when the active application is a communications application, media control service 150 can also mute or block any notifications in addition to muting the other applications' audio.

Computing device 100 is also shown as including a policy module 160 and a machine learning module 170, both of which are shown in dashed lines to represent that embodiments of the present invention may be implemented with neither module, one of the modules or both modules. Policy module 160 is intended to represent any executable component(s) that may provide and/or manage one or more policies that media control service 150 can employ to perform the functionality described herein. Machine learning module 170 is intended to represent any executable component(s) that employ machine learning techniques to enable media control service 150 to customize the functionality described herein.

Figure 2:
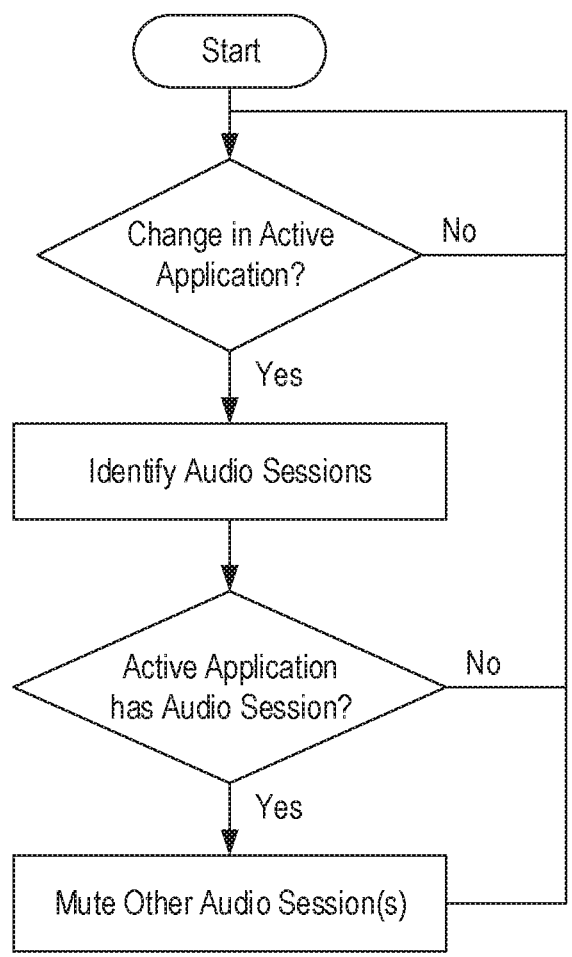
FIG. 2 illustrates an example flow diagram of a process that a media control service may perform to automatically control media on a computing device.

FIG. 2 provides a flow diagram representing functionality that media control service 150 may perform while executing on computing device 100 in some implementations of the present invention. As described herein, embodiments of the present invention encompass variations to the depicted flow diagram and therefore FIG. 2 should be viewed as an example only.

When media control service 150 is started, it can commence monitoring for changes in the active application on computing device 100. For example, media control service 150 may periodically employ OS APIs 120 to retrieve an identification of the active application (e.g., by calling the GetForegroundWindow( ) function of the Windows API or by employing the xprop utility of the X interface to identify which window has the _NET_ACTIVE_WINDOW property set) and then compare the retrieved identification to a stored identification of an application that was previously the active application. Similarly, media control service 150 could register to be notified whenever the active application changes and may then retrieve the identification of the currently active application upon being notified. Additionally or alternatively, media control service 150 could hook a function that is invoked when the active application is changed so that it may obtain the identification of the currently active application when the function is invoked. In short, media control service 150 may employ any suitable technique for determining which application is the active application at a particular time.

It is noted that, in this context, "active" is not the same as "running." For example, there may be many applications running at a particular time, but only one of the running applications may be the active application. For example, the active application may be viewed as the application owning the window in the foreground. Alternatively, the active application may be viewed as the application owning the window that has focus.

Regardless of the exact technique that media control service 150 may employ to detect whether the active application has changed, when media control service 150 determines that the active application has changed, it can identify audio sessions that have been established on computing device 100. The term "audio session" should be construed as encompassing each of the different constructs by which audio streams are represented within audio subsystem 110. For example, both the Windows Core Audio API and the PulseAudio sound server attribute a specific meaning to the term "audio session," but for purposes of this description and the claims, the term should not be limited to such specific meanings. As an overview, audio APIs 110a oftentimes enable an application to create an audio session in audio subsystem 110 whenever the application desires to play audio on computing device 100. Therefore, an audio session may be associated with a particular application. Accordingly, by identifying the audio sessions, media control service 150 may be able to identify which applications have established the audio sessions.

For example, in a Windows-based implementation, media control service 150 may enumerate the audio sessions by calling the GetCount and GetSession methods of the IAudioSessionEnumerator interface to obtain a GUID of each audio session, and may then employ the GUIDs to obtain the display names of the applications that created the audio sessions by calling the GetDisplayName method of the IAudioSessionControl interface.

In conjunction with identifying the audio sessions, media control service 150 may determine whether the active application has an audio session. If not, media control service 150 may forego muting, pausing or making other changes to any audio session. For example, if the active application is Microsoft Word, which typically does not create an audio session because it typically does not play audio, media control service 150 may not mute any audio being played by a browser tab or window or other application executing in the background. However, if the active application has an audio session, media control service 150 may mute or pause other audio sessions to thereby prevent the audio streams of the other audio sessions from overlapping with the audio stream of the active application's audio session.

In some scenarios, muting or pausing the other audio sessions may entail muting or pausing all other audio sessions. However, in other scenarios, media control service 150 may not mute or pause all other audio sessions. For example, in some embodiments, media control service 150 may be configured to determine whether the active application is a communications application, and if so, can employ communications APIs 130*a* to determine whether the communications application has established an active meeting. If media control service 150 determines that there is an active meeting, it can mute all other audio sessions (e.g., the audio sessions of all other applications as well as the audio session for alerts and system notifications so that the alerts and notifications do not distract the user during the meeting). In contrast, if the active application is not a communications application or if the active application is a communications application but there is not an active meeting, media control service 150 may forego muting the audio session for alerts and system notifications—at least until a meeting is commenced—so that the user will not miss such alerts or notifications.

Returning to the Windows-based example, media control service 150 may determine whether the active application has an audio session by comparing the display names of the applications that created the audio sessions to the name of the active application (e.g., a name obtained using the handle returned by a call to the GetForegroundWindow() function) to determine if any of the audio session display names match the name of the active application. If there is a match, media control service 150 can determine that the audio session with a matching display name is the active application's audio session and can mute other audio sessions (e.g., by using the GetSimpleAudioVolume method to access the ISimpleAudioVolume interface for the audio session and then calling the SetMute method to mute the audio session) or pause the other audio session. If there is not a match, media control service 150 could determine that the active application does not play audio and may not make any changes to the existing audio sessions.

In some embodiments, how and/or whether media control service 150 may choose to mute or pause audio sessions can be controlled using policy. For example, by default, media control service 150 may be configured to mute the audio sessions of all other applications. However, policy module 160 could provide an option for defining or receiving a policy that identifies particular applications or types of applications whose audio sessions should not be muted. For example, a policy may dictate that the audio session for alerts or system notifications should never be muted or that the audio session of a particular application should never be muted. Such a policy may also customize muting or pausing functionality based on the particular application or type of application that is the active application (e.g., never muting or pausing another audio session when a particular application is the active application, muting or pausing any audio session of certain applications or certain types of applications when a particular application is the active application). In short, policy module 150 may provide the end user, an administrator or another individual with the ability to customize media control service 150's functionality in a variety of ways including providing the criteria that media control service 150 should use when determining whether to mute or pause the audio session of a particular application.

Similarly, media control service 150 could employ machine learning module 170 to customize its functionality based on the user's interaction over time. For example, machine learning module 170 may employ machine learning techniques to learn which applications or types of applications the user mutes or pauses, or does not mute or pause, when another application is playing audio, to learn whether the user mutes notifications during a meeting, to learn which applications' audio sessions the user allows to overlap, to identify circumstances where the user mutes or pauses media, etc. Such learning could be used to directly modify media control service 150's functionality or to modify or create a policy that media control service 150 employs.

FIGS. 3A-3E provide a Windows-based example of some of the above-described functionality. This example should not be viewed as limiting embodiments of the present invention in any way.

Figure 3A:
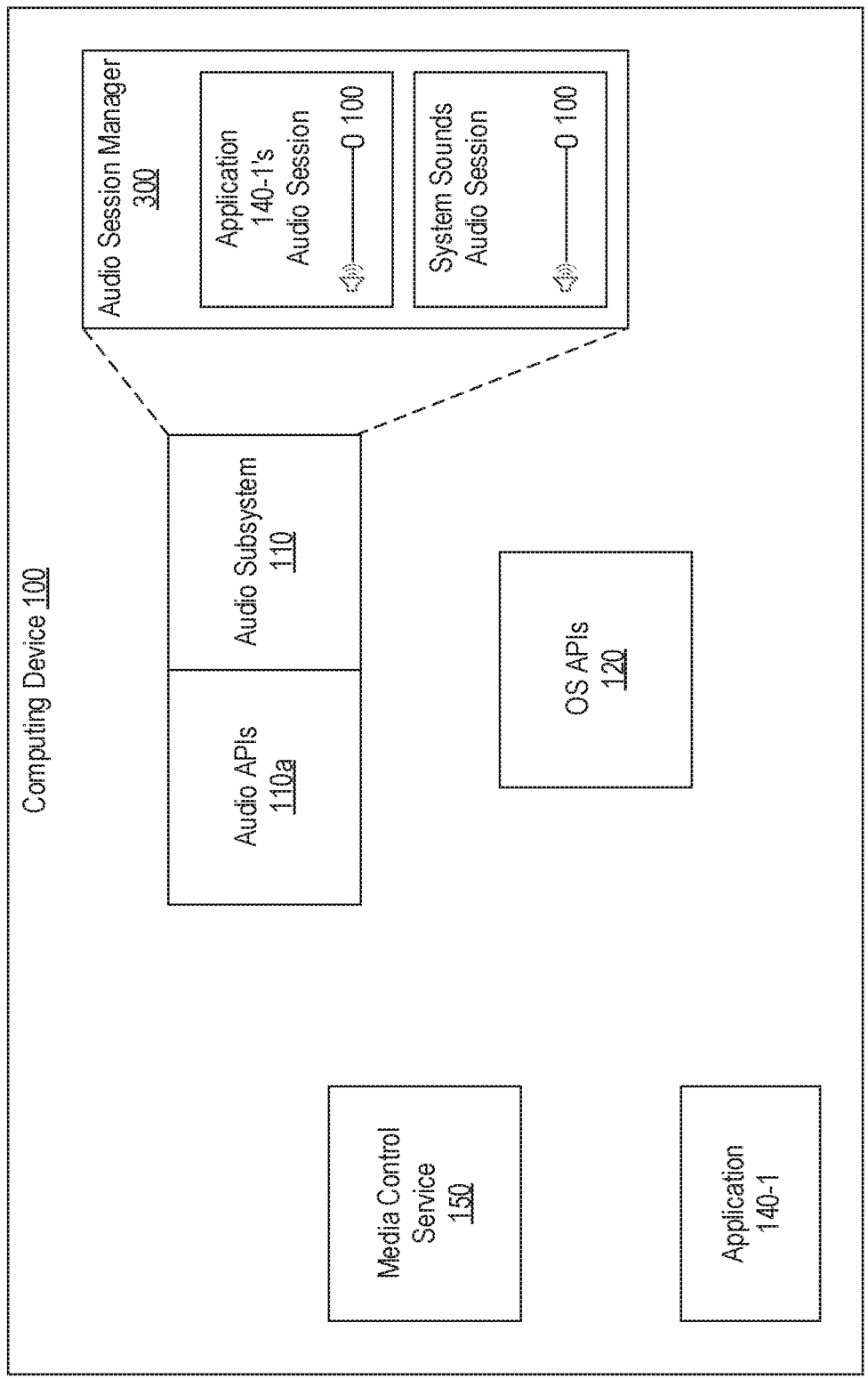
FIGS. 3A-3E provide an example of how a media control service may automatically control media on a computing device.

In FIG. 3A, it is assumed that media control service 150 and application 140-1 are running on computing device 100. As reflected in audio session manager 300, which can represent a data structure that audio subsystem 110 maintains for the purpose of defining and controlling audio sessions, it is also assumed that application 140-1 has established an audio session with audio subsystem 110 and that the default "System Sounds" audio session exists. It is further assumed that both of these audio sessions have their volume set to the maximum value. Accordingly, any audio played by application 140-1 and any alert or system notification will be audibly output from the audio device endpoint that audio session manager 300 represents (e.g., a built-in speaker of computing device 100). In this state, media control service 150 could periodically call the GetForegroundWindow() function of OS APIs 120 to identify the currently active application, could register to be notified when the foreground window changes, could hook a function of the operating system to be able to detect when the foreground window changes, or could perform any other suitable functionality to be able to determine when the active application changes. Also, in this state, application 140-1 may or may not be the active application.

Figure 3B:
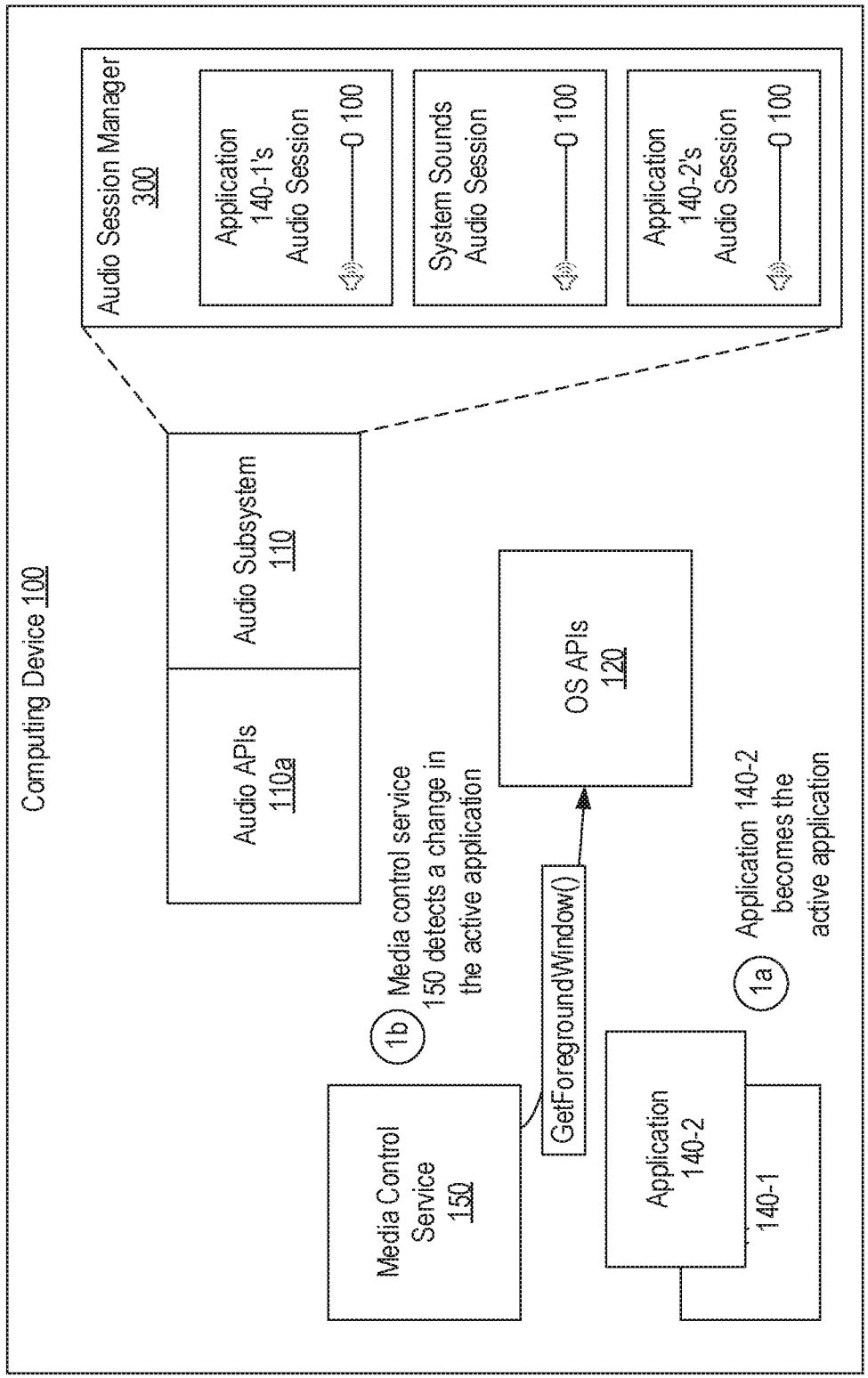

Turning to FIG. 3B, in step 1*a*, it is assumed that application 140-2 becomes the active application. For example, the user may open a browser, a new browser window, a new browser tab, a media player, a conferencing application, etc. It is also assumed that application 140-2 creates an audio session with audio session manager 300. For example, as part of being loaded, the browser, browser window, browser tab, media player, conferencing application, etc. could employ audio APIs 110*a* to create an audio session with audio subsystem 110. In conjunction with application 140-2 becoming the active application, it is assumed that media control service 150 detects that application 140-2 has become the active application. For example, FIG. 3B shows media control service 150 calling the GetForegroundWindow() function by which it may receive a handle to application 140-2's window. Using this handle, media control service 150 may obtain any suitable identifier of application 140-2 such as, but not limited to, its display name. Notably, in the state represented in FIG. 3B (i.e., without media control service 150 performing the functionality described herein), because all three depicted audio sessions are not muted, any audio concurrently streamed through these audio sessions will audibly overlap (e.g., all audio will be played simultaneously over the same speaker).

Figure 3C:
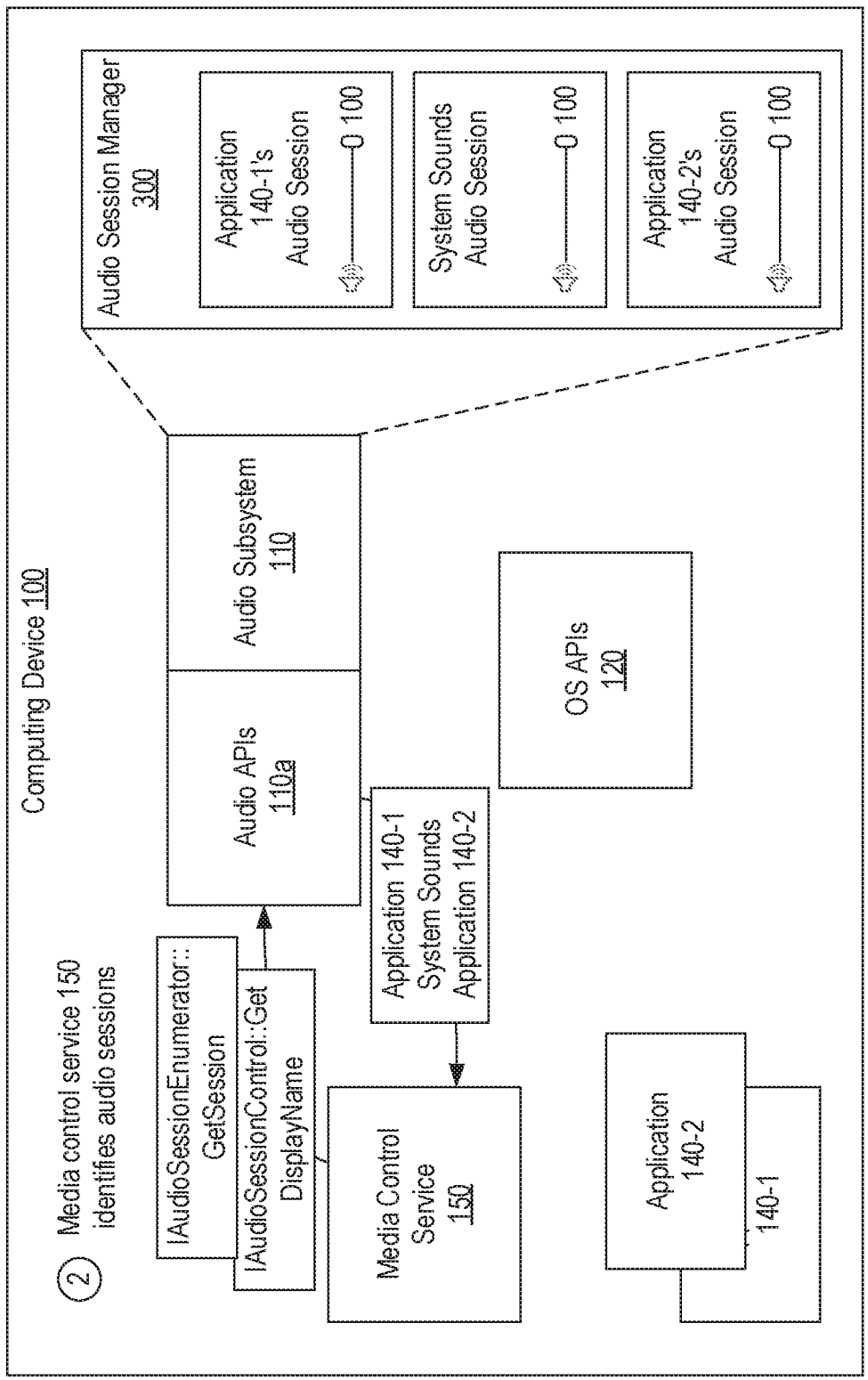

Turning to FIG. 3C, in step 2 and in conjunction with determining that application 140-2 has become the active application, media control service 150 can identify the audio sessions that have been created in audio subsystem 110, or more particularly, each audio session associated with a particular audio device. For example, media control service 150 could employ the IAudioSessionEnumerator interface to obtain a GUID of each audio session and then employ the IAudioSessionControl interface for each audio session to obtain the display names of the audio sessions. In the depicted example, media control service 150 may receive the display names of Application 140-1, System Sounds and Application 140-2. Accordingly, at this stage, media control service 150 may store the display name or other identifier of the active application, a GUID or other identifier of each audio session and the display name for each audio session.

Figure 3D:
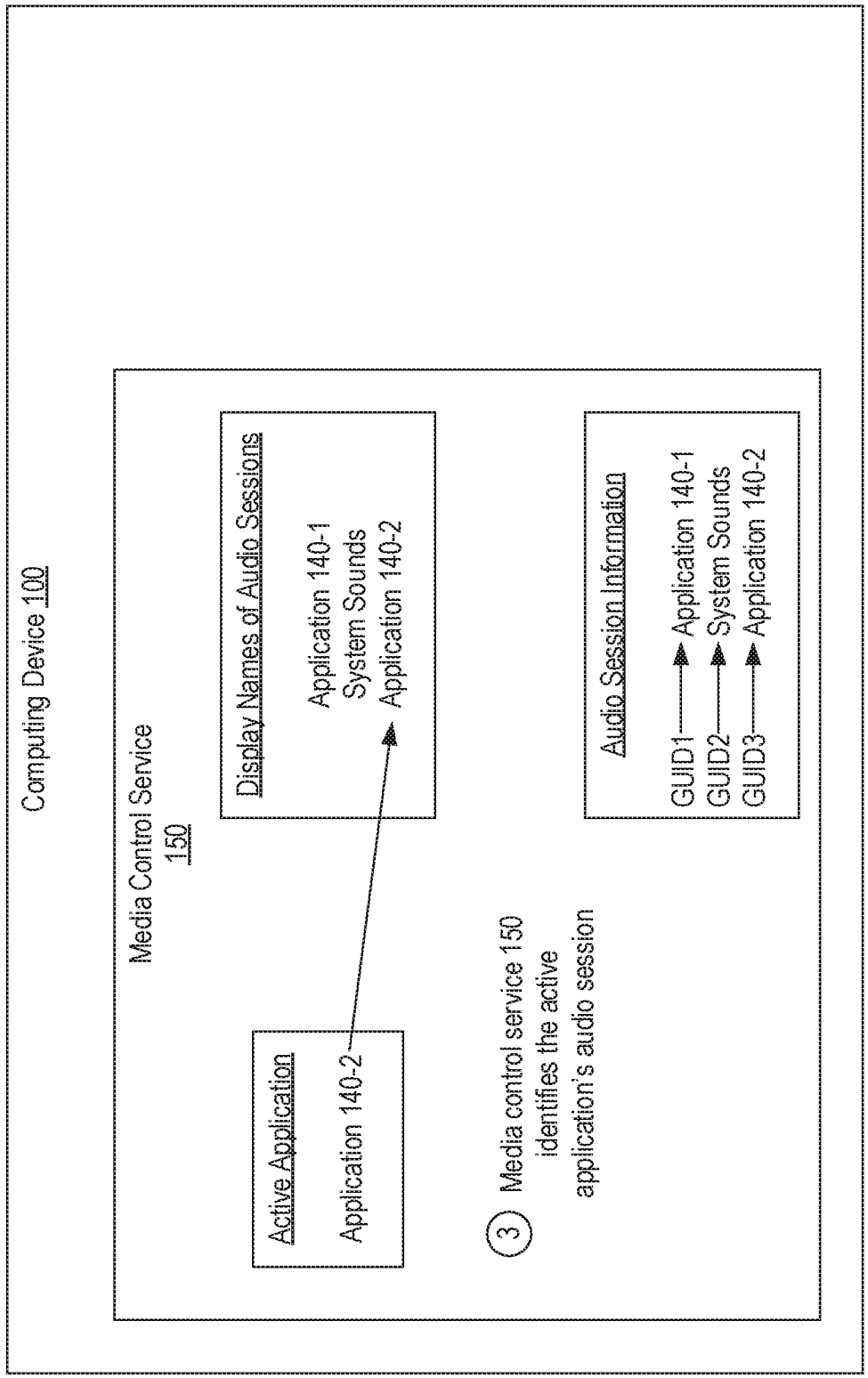

Turning to FIG. 3D, in step 3, media control service 150 can identify the active application's audio session. For example, using an identifier, such as the display name, of application 140-2 that it obtained in step 1b, media control service 150 can identify any matching identifier, such as the display name, of an audio session that media control service 150 obtained in step 2. In this case, media control service 150 can identify application 140-2's audio session. FIG. 3D also represents that media control service 150 could have retained audio session information which associates each audio session's display name with a GUID or other identifier of the audio session.

Figure 3E:
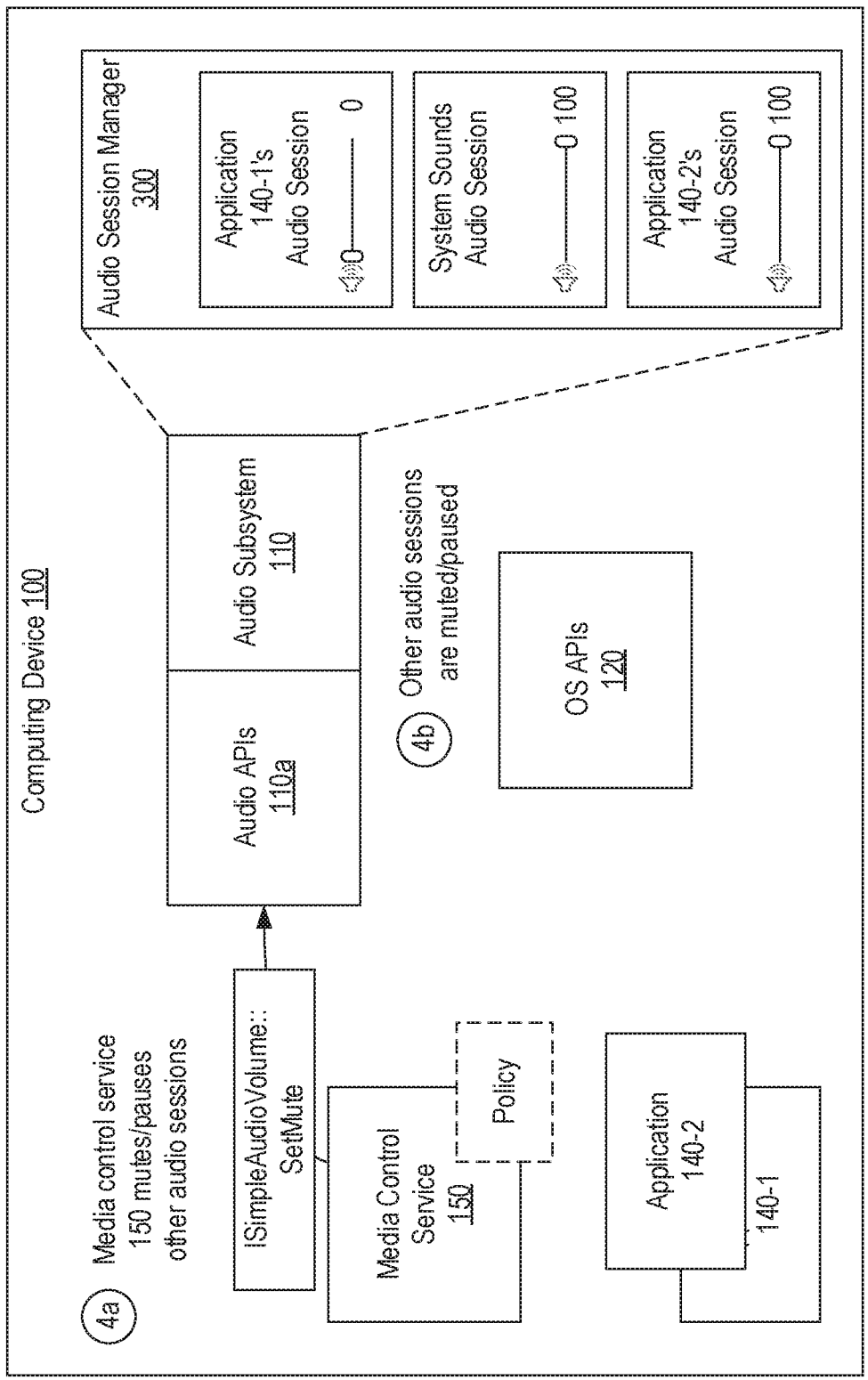

Turning to FIG. 3E, in step 4a, media control service 150 can mute/pause audio sessions that do not pertain to the active application and may do so based on a policy. For example, media control service 150 can determine that the audio session having a display name of Application 140-1 is not that active application's audio session, may access any applicable policy to determine that application 140-1's audio session should be muted/paused, may employ the GUID of application 140-1's audio session to obtain a simple audio volume control and may then use this control to call the SetMute method. In response, in step 4b, audio subsystem 110 will cause the volume of application 140-1's audio session to be muted.

In FIG. 3E, it is assumed that media control service 150 did not mute the system sounds audio session and therefore this audio session's volume remains at 100. Accordingly, while application 140-2's audio session plays audio, any alerts or notifications output via the system sounds audio session will also be audibly output. Of course, media control service 150 could have also muted the system sounds audio session such as when application 140-2 is a communications application and a meeting is active or when policy dictates.

Although not shown, during this process, machine learning module 170 could monitor the user's interactions with computing device 100 to determine whether any adjustments in media control service 150 or an applicable policy should be made. For example, if the user unmutes the volume of application 140-1's audio session after media control service 150 mutes it and the user has repeatedly done so when application 140-2 is the active application, machine learning module 170 could cause an applicable policy to be revised to prevent media control service 150 from muting application 140-1's audio session when application 140-2 is the active application.

In summary, media control service 150 can automatically mute or pause audio sessions for any non-active or background application. Embodiments of the present invention may be beneficial for many different scenarios including to mute or pause audio in any browser tabs or windows that are not active whether the tabs or windows are from the same or different browser or to mute or pause audio in any other applications. This automatic muting or pausing of audio can enhance the user experience by limiting or eliminating instances where audio overlaps. The muting or pausing can also be customized for a particular user or type of user based on policy and/or machine learning.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a media control service executing on a computing device, for automatically controlling media based on a user-defined policy, the method comprising:

receiving a user-defined policy that identifies whether audio sessions of particular applications or types of applications should be muted;

identifying a plurality of audio sessions on the computing device by obtaining identifiers of a plurality of applications that created the plurality of audio sessions and using the identifiers to obtain display names of the plurality of applications;

determining that a first application of the plurality of applications is an active application by comparing a display name of the active application to the display name of the first application;
determining that one or more audio sessions of the plurality of audio sessions do not pertain to the active application by comparing the display name of the active application to the display names of the plurality of applications that created the plurality of audio sessions;
accessing the user-defined policy to determine that the audio from the one or more audio sessions should be prevented from being audibly output on the computing device when the first application is the active application;
based on the user-defined policy, preventing audio from the one or more audio sessions from being audibly output on the computing device,
detecting an end user's interaction with media controls that cause a first audio session of the one or more audio sessions to no longer be prevented from being audibly output on the computing device while the first application remains the active application, the first audio session pertaining to a second application; and
customizing the user-defined policy based on the end user's interaction to define that audio from an audio session pertaining to the second application should not be prevented from being audibly output on the computing device when the first application is the active application.

2. The method of claim 1, further comprising:
detecting that the active application has changed;
wherein the plurality of audio sessions are identified in response to detecting that the active application has changed.

3. The method of claim 1, wherein the active application is an application having a window in the foreground or with focus.

4. The method of claim 1, wherein preventing audio from the one or more audio sessions from being audibly output on the computing device comprises muting the one or more audio sessions.

5. The method of claim 1, wherein the one or more audio sessions include all audio sessions on the computing device that do not pertain to the active application.

6. The method of claim 1, wherein the one or more audio sessions include all audio sessions on the computing device that do not pertain to the active application except for an audio session used to play alerts and system notifications, and wherein the user-defined policy indicates that the audio session used to play alerts and system notifications should not be muted when the first application is the active application.

7. The method of claim 1, wherein the first application is a first tab of a browser and at least one of the one or more audio sessions pertains to another tab of the browser.

8. The method of claim 1, further comprising:
based on the user-defined policy, determining that the audio from another of the plurality of audio sessions should not be prevented from being audibly output on the computing device when the first application is the active application.

9. The method of claim 1, wherein the user-defined policy is defined by an end user of the computing device or an administrator.

10. One or more computer storage media storing computer executable instructions which when executed implement a media control service that is configured to perform a method for automatically controlling media based on a user-defined policy, the method comprising:
receiving a user-defined policy that identifies whether audio sessions of particular applications or types of applications should be muted;
identifying an active application;
obtaining a display name of the active application to thereby determine that the active application is a first application;
identifying a plurality of audio sessions on the computing device;
obtaining display names of a plurality of applications that created the plurality of audio sessions;
using the display name of the active application and the display names of the plurality of applications that created the plurality of audio sessions to identify a first audio session of the plurality of audio sessions that the active application created;
accessing the user-defined policy to determine that one or more other audio sessions of the plurality of audio sessions should be prevented from being audibly output on the computing device when the first application is the active application; based on the user-defined policy, preventing audio from the one or more other audio sessions of the plurality of audio sessions from being audibly output on the computing device while the first application is the active application;
detecting an end user's interaction with media controls that cause a first audio session of the one or more other audio sessions to no longer be prevented from being audibly output on the computing device while the first application remains the active application, the first audio session pertaining to a second applications; and
customizing the user-defined policy based on the end user's interaction to define that audio from an audio session pertaining to the second application should not be prevented from being audibly output on the computing device when the first application is the active application.

11. The computer storage media of claim 10, further comprising:
in conjunction with identifying the active application, identifying that the active application has changed.

12. The computer storage media of claim 10, wherein preventing audio from the one or more other audio sessions from being audibly output on the computing device comprises muting the one or more other audio sessions.

13. The computer storage media of claim 12, wherein the one or more other audio sessions do not include an audio session used to play alerts and system notifications.

14. A computing device comprising:
one or more processors; and
one or more computer storage media storing computer executable instructions which when executed by the one or more processors implement a media control service that is configured to perform a method for selectively muting audio sessions based on a user-defined policy, the method comprising:
receiving a user-defined policy that identifies whether audio sessions of particular applications or types of applications should be muted;
identifying an active application;
obtaining a display name of the active application to thereby determine that the active application is a first application;
identifying a plurality of audio sessions on the computing device;

obtaining display names of a plurality of applications that created the plurality of audio sessions;

using the display name of the active application and the display names of the plurality of applications that created the plurality of audio sessions to determine that one or more audio sessions of the plurality of audio sessions was not created by the active application;

accessing the user-defined policy to determine that the one or more audio sessions should be prevented from being audibly output on the computing device when the first application is the active application;

based on the user-defined policy, muting the one or more audio sessions;

detecting an end user's interaction with media controls that cause a first audio session of the one or more audio sessions to no longer be muted while the first application remains the active application, the first audio session pertaining to a second application; and customizing the user-defined policy based on the end user's interaction to define that audio from an audio session pertaining to the second application should not be muted when the first application is the active application.

* * * * *